United States Patent Office 3,427,305
Patented Feb. 11, 1969

3,427,305
5 - [(HALO/ALKOXY)PHENYL] - 1 - [p - SULFON-AMIDO(PHENYL/BENZYL)] - 2 - PYRROLEPRO-PIONIC ACIDS
Leland J. Chinn, Morton Grove, Ill., assignor to G. D. Searle & Co., Chicago, Ill., a corporation of Delaware
No Drawing. Filed Nov. 1, 1966, Ser. No. 591,120
U.S. Cl. 260—239.6    6 Claims
Int. Cl. C07d 27/26; A61k 27/00

This invention relates to 5-[(halo/alkoxy)phenyl]-1-[p-sulfonamido(phenyl/benzyl)]-2-pyrrolepropionic acids and processes for the preparation thereof. More particularly, this invention provides new, useful, and unobvious chemical compounds of the formula

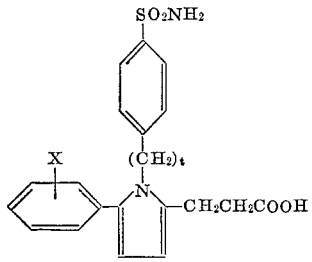

wherein X represents halogen or an alkoxy radical and $t$ represents O or a small positive integer. Those skilled in the art will understand that when $t$ represents O, the enformulated compounds are 1-sulfonamidophenylpyrrole derivatives, as distinct from the 1-sulfonamidobenzyl-pyrrole, 1-sulfonamidophenethylpyrrole, etc. derivatives involved when $t$ represents 1, 2, etc.

Among the halogens represented by X in the foregoing formula, fluorine, chlorine, and bromine are especially preferred; and the alkoxy radicals represented by X are most desirably of lower order, e.g., methoxy, ethoxy, propoxy, isopropoxy, butoxy, isobutoxy, sec-butoxy, tert-butoxy, pentyloxy, neopentyloxy (i.e., 2,2-dimethylpropoxy), hexyloxy, isohexyloxy, heptyloxy, and like monovalent, saturated, acyclic, straight- or branched-chain groupings of the formula $$C_nH_{2n+1}O-$$

wherein $n$ represents a positive integer less than 8. The positioning of X with respect to the point of attachment of the phenyl radical wherein it represents a substituent is not critical, ortho, meta, and para isomers all being adapted to the purposes herein set forth.

The compounds to which this invention relates are useful by reason of their valuable pharmacological properties. Thus, for example, they inhibit the hydrolysis of hemoglobin by pepsin, block the effect of desoxycorticosterone acetate on urinary sodium and potassium, reduce edema and granuloma-formation associated with the inflammatory response to tissue insult, and are antibiotic in respect of *Tetrahymena gelleii* and *Dicotyledoniae*.

Preparation of the subject compounds proceeds by heating an appropriate diketo acid of the formula

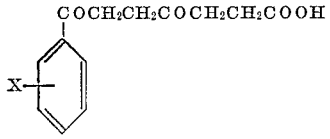

with an appropriate benzenesulfonamide

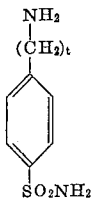

in the presence of a dehydrating agent such as p-toluenesulfonic acid, using toluene or a comparably inert organic solvent as the reaction medium. Water is removed as formed in process. (The meanings of X and $t$ in the latter two formulas remain as previously assigned.)

The following examples described in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

5-(p-fluorophenyl)-1-(p-sulfonamidophenyl)-2-pyrrolepropionic acid

A mixture of 300 parts of 7-(p-fluorophenyl)-4,7-dioxoheptanoic acid, 200 parts of sulfanilamide, 25 parts of p-toluenesulfonic acid monohydrate, and 8700 parts of toluene is heated at the boiling point under reflux for 24 hours. Water is removed as formed in process. At the end of the prescribed heating period, the reaction mixture is cooled to room temperature; and the solid precipitate which forms is filtered off, washed successively with ether and water, dried in air, and recrystallized from ethyl acetate to give 5-(p-fluorophenyl)-1-(p-sulfonamidophenyl)-2-pyrrolepropionic acid melting at 229.5–232.5°. The product has the formula

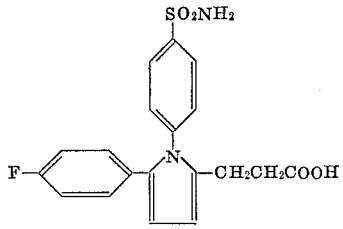

EXAMPLE 2

5-(p-fluorophenyl)-1-(p-sulfonamidobenzyl)-2-pyrrolepropionic acid

A mixture of 200 parts of 7-(p-fluorophenyl)-4,7-dioxoheptanoic acid, 130 parts of p-aminomethylbenzene-sulfonamide hydrochloride, 38 parts of sodium methoxide, 15 parts of p-toluenesulfonic acid monohydrate, and 8700 parts of toluene is heated at the boiling point under reflux for 16 hours. Water is removed as formed in process. The resultant mixture is stripped of solvent by vacuum distillation, whereupon water is added to the residue, causing formation of a gum. The gum is collected on a filter, washed thereon with water, dried in air, and crystallized from a mixture of ethyl acetate and ether to give 5-(p-fluorophenyl) - 1 - (p - sulfonamidobenzyl)-2-pyrrolepropionic acid melting at 169.5–171.5°. The product has the formula

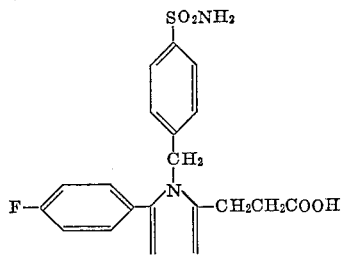

EXAMPLE 3

5-(p-chlorophenyl)-1-(p-sulfonamidophenyl)-2-pyrrelepropionic acid

A mixture of 200 parts of 7-(p-chlorophenyl)-4,7-dioxoheptanoic acid, 130 parts of sulfanilamide, 15 parts of p-toluenesulfonic acid monohydrate, and 8700 parts of toluene is heated at the boiling point under reflux for 3 days, during which time water is removed as formed. The resultant mixture is concentrated to one-fourth of its original volume by vacuum distillation, and the concentrate is diluted with hexane q.s. formation of a solid precipitate. The precipitate is filtered off, washed successively with hexane and water, dried in air, and recrystallized from a mixture of acetone and ethyl acetate to give 5-(p-chlorophenyl)-1-(p-sulfonamidophenyl)-2-pyrrolepropionic acid melting at 256.5–259.5°. The product has the formula

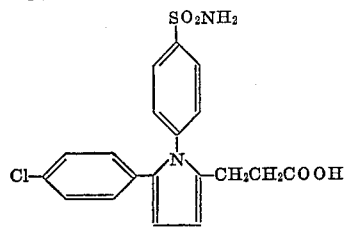

EXAMPLE 4

5-(m-bromophenyl)-1-(p-sulfonamidobenzyl)-2-pyrrolepropionic acid

A mixture of 200 parts of 7-(m-bromophenyl)-4,7-dioxoheptanoic acid, 130 parts of p-aminomethylbenzenesulfonamide hydrochloride, 38 parts of sodium methoxide, 15 parts of p-toluenesulfonic acid monohydrate, and 8700 parts of toluene is heated at the boiling point under reflux for 16 hours. Water is removed as formed in process. At the close of the prescribed heating period, the reaction mixture is distilled in vacuo almost to dryness, whereupon the residue is acidified with approximately 6% hydrochloric acid and the resultant mixture is extracted with ethyl acetate. The ethyl acetate extract is washed with water, dried over anhydrous sodium sulfate, and stripped of solvent by vacuum distillation. The residue is 5-(m-bromophenyl)-1-(p-sulfonamidobenzyl) - 2 - pyrrolepropionic acid, having the formula

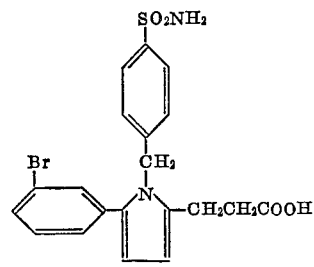

EXAMPLE 5

5-(p-methoxyphenyl)-1-(p-sulfonamidophenyl)-2-pyrrolepropionic acid

A mixture of 200 parts of 7-(p-methoxyphenyl)-4,7-dioxoheptanoic acid, 110 parts of sulfanilamide, 15 parts of p-toluenesulfonic acid monohydrate, and 8700 parts of toluene is heated at the boiling point under reflux for 15 hours during which water is removed as formed. The reaction mixture is then concentrated to one-fourth of its original volume by vacuum distillation, and the concentrate is diluted with hexane q.s. formation of a solid precipitate. The precipitate is filtered off, washed successively with hexane and water, dried in air, and recrystallized from a mixture of ethyl acetate and hexane to give 5 - (p-methoxyphenyl)-1-(p-sulfonamidophenyl)-2-pyrrolepropionic acid melting at 176–180.5°. The product has the formula

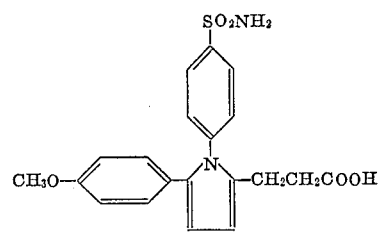

What is claimed is:
1. A compound of the formula

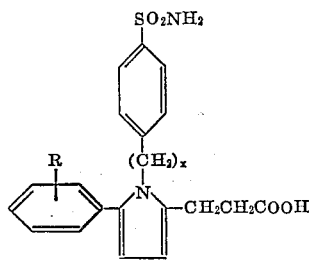

wherein R represents halogen of atomic number less than 53 or lower alkoxy and $x$ represents 0 or 1.

2. A compound according to claim 1 wherein R represents halogen of atomic number less than 53.

3. A compound according to claim 1 which is 5-(p-fluorophenyl)-1-(p-sulfonamidophenyl) - 2 - pyrrolepropionic acid.

4. A compound according to claim 1 which is 5-(p-fluorophenyl)-1-(p-sulfonamidobenzyl) - 2 - pyrrolepropionic acid.

5. A compound according to claim 1 which is 5-(p-chlorophenyl)-1-(p-sulfonamidophenyl) - 2 - pyrrolepropionic acid.

6. A compound according to claim 1 which is 5-(p-methoxyphenyl)-1-(β-sulfonamidophenyl) - 2 - pyrrolepropionic acid.

References Cited

UNITED STATES PATENTS

| | | | |
|---|---|---|---|
| 3,349,091 | 10/1967 | Chinn | 260—268 |
| 3,168,532 | 2/1965 | Short | 260—326.3 |
| 3,168,531 | 2/1965 | Short | 260—326.3 |
| 3,168,529 | 2/1965 | Short | 260—326.3 |
| 3,168,528 | 2/1965 | Short | 260—326.3 |
| 3,168,527 | 2/1965 | Short | 260—326.3 |

JOHN D. RANDOLPH, *Primary Examiner.*

C. M. SHURKO, *Assistant Examiner.*

U.S. Cl. X.R.

260—326.3, 556, 999